Patented Dec. 22, 1953

2,663,712

UNITED STATES PATENT OFFICE 2,663,712

HYDROXY-BENZIMIDAZOLES AND METHOD FOR THEIR PREPARATION

Vsevolod Tulagin, Phillipsburg, N. J., assignor to General Aniline & Film Corporation, New York, N. Y., a corporation of Delaware No Drawing. Application November 22, 1949, Serial No. 128,930

11 Claims. (Cl. 260—309.2)

This invention relates to novel compounds of the hydroxybenzimidazole series and a process for their preparation. The novel compounds of this invention are hydroxy-benzimidazoles (either in the form of free bases or as salts thereof with acids), wherein the hydroxyl group occupies a position in the benzene ring ortho to a nitrogen of the imidazole ring, said benzene ring having an unsubstituted position para to the hydroxyl group, and the remaining positions (positions 5 and 6) occupied, respectively, by hydrogen and a member of the group consisting of hydrogen, alkyl and aryl radicals; and said imidazole ring having the 2- position occupied by hydrogen, an alkyl or an aryl group, and a nitrogen atom occupied by hydrogen or an alkyl or aralkyl group.

Thus, the compounds of this invention, in the form of their free bases, can be represented by the following formula:

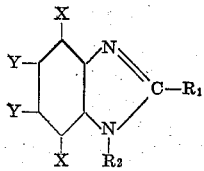

wherein $R_1$ represents a member of the class consisting of H, alkyl and aryl groups, $R_2$ represents a member of the class consisting of H, alkyl and aralkyl groups, one X represents OH and the other H, and one Y represents H and the other Y represents a member of the group consisting of H, alkyl and aryl radicals.

Preferred compounds in accordance with the invention are 2-alkyl- and 2-aryl-ortho-hydroxy-benzimidazoles, as defined above, in which the alkyl and aryl groups (represented by $R_1$ in the foregoing formula) are hydrocarbon radicals. The term "ortho-hydroxy-benzimidazole" is employed herein to signify a hydroxy-benzimidazole in which the hydroxyl group is in ortho position to a nitrogen of the imidazole ring.

The compounds of the invention are valuable as dyestuff intermediates, particularly as coupling components in the preparation of azo dyestuffs by reaction with aromatic diazo compounds. The compounds are particularly useful, and especially the preferred class thereof mentioned above, as coupling components in the preparation of diazotype light-sensitive layers in which they form image colorations by coupling with a light-sensitive diazo compound. When employed for the latter purpose, they yield dense, brilliant image colorations fast to light and washing, in which the background areas resist discoloration on exposure to light and air. They are compatible with the other components of diazotype sensitizing compositions in aqueous solutions commonly employed for this purpose, and the photosensitized materials obtained therewith are stable against premature coupling or discoloration in storage.

Hydroxy-benzimidazoles were known heretofore, but previously known compounds contained the hydroxyl group in 5- or 6- position, and were unsatisfactory as azo coupling components.

The compounds of this invention are prepared from lower alkyl (e. g. methyl or ethyl) ethers of 2,3-diaminophenol or nuclear substitution products thereof, containing an alkyl or aryl group in 5- or 6- position. These diaminophenol ethers can be obtained from the corresponding 2,3-dinitrophenol ethers, which are prepared according to the procedure of Meldola and Eyre, J. C. S., vol. 81 (1902), page 990, involving dinitration of a p-acetamidophenol ether, and reaction with sufuric acid, ethanol and a nitrite to replace the acetamido group with hydrogen. The nitro groups in the resulting 2,3-dinitrophenol ether are then reduced to amino groups, e. g. by treatment with hydrogen in the presence of a hydrogenation catalyst such as platinum oxide.

In accordance with the invention, the resulting 2,3-diaminophenol ether is heated with an aliphatic or aromatic carboxy acid anhydride until the corresponding ortho-alkoxy-benzimidazole is formed. The alkoxy group is then hydrolyzed to an hydroxyl group by heating with concentrated aqueous hydrobromic acid. The benzimidazole hydrobromide thus formed can be converted to the corresponding free base by treatment with an alkaline neutralizing agent, and the free base can be neutralized, if desired, with another acid to form the benzimidazole salt of the latter acid. Direct conversion of the hydroxy-benzimidazole hydrobromide, initially formed, to salts of stronger mineral acids, such as hydrochloric acid, can also be effected by heating the benzimidazole hydrobromide with the strong mineral acid until the hydrobromic acid is displaced.

The carboxy acid anhydride which reacts with the 2,3-diaminophenol ether determines the nature of the substituent in the 2- position of the benzimidazole nucleus. Thus, acetic acid anhydride yields a 2-methyl-substituted benzimidazole; and homologues in which higher alkyl groups occupy the 2- position result from using anhydrides of the higher homologues of acetic acid. Benzimidazoles of the invention which contain hydrogen in 2- position are best obtained by employing a mixed anhydride of formic and acetic acid, and those containing an aryl (e. g. phenyl radical) in 2- position are conveniently prepared by employing a mixed anhydride of acetic acid with the corresponding aryl carboxylic acid such as benzoic or toluic acid.

One of the nitrogen atoms of the benzimidazole ring can be alkylated, if desired, by reaction of the alkoxy benzimidazole, formed as an intermediate, with an alkyl or aralkyl halide such as ethyl bromide or benzyl chloride, in an inert solvent such as alcohol. The alkoxy group in the resulting product can then be converted to a phenolic hydroxy group in the manner described above.

Purification of the products can be conveniently effected by conversion of the hydrobromide to the hydrochloride, and recrystallization of the latter from aqueous solution.

The following examples illustrate preferred methods for preparing the compounds of this invention. In the examples, parts are by weight unless otherwise specified, and parts by volume signify the volume of an equal number of parts by weight of water.

EXAMPLE 1

(a) Preparation of 2,3-diaminoanisole hydrochloride 8 parts of 2,3-dinitro-4-acetamido-anisole (prepared by the method of Meldola and Eyre (loc. cit.) were added to an agitated mixture of 37 parts concentrated sulfuric acid with 80 parts by volume of absolute ethyl alcohol, while cooling the mixture. The reaction mixture was then heated over a steam bath until complete solution was obtained, requiring about 2 hours, and then cooled to 0–5° C. A solution of 2.7 parts of sodium nitrite in 5 parts of water was added, and after 10 minutes, the mixture was heated to boiling. Gaseous nitrogen was evolved and when the evolution subsided, the mixture was poured into an equal volume of water. A suspension of 2,3-dinitroanisole was thus obtained, from which the product was recovered by filtration, washed, and purified by recrystallization from ethyl alcohol.

13 parts of 2,3-dinitroanisole were dissolved in 100 parts by weight of ethyl alcohol in which was suspended 0.2 part of a platinum oxide hydrogenation catalyst (Adams), and the mixture hydrogenated at 60 pounds pressure with hydrogen for 3 hours. 10 parts by volume of concentrated hydrochloric acid were added, and the mixture evaporated to dryness. The hydrochloride obtained as a residue was dissolved in 20 parts of water, the solution diluted with 80 parts by volume of absolute ethanol, the diluted solution decolorized by treatment with active charcoal, and after filtering, 30 parts by volume of concentrated hydrochloric acid were added to the filtrate which was then cooled. The crystalline hydrochloride of 2,3-diaminoanisole separated from the solution and was recovered by filtration and washing with absolute alcohol, and dried.

(b) Preparation of 2-methyl-ortho-hydroxy-benzimidazole 6.5 parts of 2,3-diaminoanisole hydrochloride and 32 parts by volume of acetic anhydride were mixed in a reflux apparatus and heated to boiling for 45 minutes. 30 parts of 48% aqueous hydrobromic acid were cautiously added, and the mixture heated to boiling under reflux for 4 hours. On evaporation to dryness, a residue was obtained which was the hydrobromide of 2-methyl-ortho-hydroxy-benzimidazole.

The residual hydrobromide was dissolved in 20 parts by volume of boiling absolute ethanol, and 10 parts by volume of concentrated aqueous hydrochloric acid were added. On cooling the mixture to about 0° C., 2-methyl-ortho-hydroxy-benzimidazole hydrochloride separated from the solution in the form of white crystals which were recovered by filtration, and dried.

The product, when coupled with a p-diethylamino benzene diazonium compound in a diazotype layer, yielded a brilliant, deep maroon shade as the image coloration, the background having outstanding stability to discoloration.

By employing an equal amount of the mixed anhydride of acetic and formic acids instead of acetic anhydride in the foregoing example, ortho-hydroxy-benzimidazole hydrochloride is obtained in like manner.

Similarly, by substituting an equimolecular amount of propionic anhydride or of butyric anhydride for the acetic anhydride of the example, 2-ethyl-ortho-hydroxy-benzimidazole and 2-propyl-ortho-hydroxy-benzimidazole can be obtained in the form of their hydrochlorides.

By employing an equimolecular amount of the mixed anhydride of benzoic acid and acetic acid instead of the acetic anhydride of the example, 2-phenyl-ortho-hydroxy-benzimidazole hydrochloride is obtained. The mixed anhydride of acetic acid and benzoic acid can be prepared beforehand, or more conveniently, in the reaction mixture, by reaction of benzoyl chloride with an equimolecular amount of sodium acetate. By substituting 3- or 4-nitrobenzoyl chloride for benzoyl chloride in such a process, the 2-(3'- or 4'-nitrophenyl)ortho-hydroxy-benzimidazole hydrochloride is produced.

EXAMPLE 2

2-methoxy-5-acetamidotoluene was dinitrated, and the resulting 3,4-dinitro compound was treated in accordance with the procedure described in Examples 1(a) and 1(b). The final product thus obtained was 2,6-dimethyl-ortho-hydroxy-benzimidazole hydrochloride.

EXAMPLE 3

2-hydroxy-5-nitro-biphenyl was prepared as described by Borsche and Schelden in Ber. 50, page 600, and was converted to the corresponding methyl ether by heating the corresponding sodium phenolate with methyl iodide. The resulting nitromethyl ether is reduced to the corresponding amino compound, the amino group acetylated and the acetylamino compound dinitrated in the manner described by Meldola and Eyre (loc. cit.). The 2-methoxy-3,4-dinitro-5-acetamino-biphenyl thus obtained was processed in the same manner as the 2,3-dinitro-4-acetamido-anisole of Examples 1(a) and 1(b), whereby 2-methyl-6-phenyl-7-hydroxy-benzimidazole hydrochloride was obtained as the final product.

EXAMPLE 4

6.5 parts of 2,3-diaminoanisole hydrochloride, obtained in accordance with Example 1 (a), was refluxed with 32 parts by volume of acetic anhydride for 45 minutes. The solution was evaporated to dryness to yield 2-methyl-ortho-methoxy-benzimidazole hydrochloride. The residue was taken up in absolute alcohol and converted to the free base by reaction of the calculated amount of sodium carbonate, and the insoluble sodium salts filtered from the alcoholic solution of the base. A solution of 3.2 parts of the resulting benzimidazole in 20 parts by volume of absolute alcohol was mixed with 10 parts by volume of ethyl bromide, and the mixture heated under reflux for 24 hours. After evaporating the mixture to dryness, the residue was mixed with 50 parts by volume of 40% hydrobromic acid, and heated under reflux for 20 hours. After evaporating to dryness, the residue was taken up in a small amount of water, and the solution cooled, whereupon a crystalline product separated which was recovered by filtration. The product thus obtained was 2-methyl-N-ethyl-ortho-hydroxybenzimidazole hydrobromide.

The products of the foregoing examples are susceptible to coupling in the unsubstituted position of the benzene ring, para to the hydroxyl group, with aromatic diazo components to yield azo compounds. Substituents in the 5- or 6- position of the benzimidazole nucleus can be varied by employing 5- or 6-substituted 2,3-diamonoanisoles or phenetoles as starting materials. Such substitutes are especially alkyl and aryl radicals as illustrated in the foregoing examples.

In the reduction of the 2,3-dinitrophenol ethers to the corresponding diamino compounds serving as intermediates in the process of this invention, catalytic hydrogenation disclosed in the examples offers a convenient procedure, but other methods of reduction can be used, as for example, reaction with metals such as tin, zinc or iron in the presence of hydrochloric acid.

In converting the alkoxybenzimidazoles to the corresponding hydroxy-benzimidazoles, the concentrated aqueous hydrobromic acid employed should have a concentration of at least 25%, the concentration being of the order of 40 to 50% as disclosed in the examples.

Other N-substituted derivatives are obtained by the process of Example 4, employing other alkyl halides, or aralkyl halides such as benzyl chloride or bromide, instead of ethyl bromide.

The benzimidazoles specified in the claims signify these compounds in the form of free bases, as well as salts thereof with acids. The free bases can be obtained from the salts by the procedure employed in Example 4 to convert the intermediate alkoxy-benzimidazole hydrochloride to the corresponding free base.

Other variations and modifications, which will be obvious to those skilled in the art, can be made in the procedure disclosed in the examples without departing from the scope or spirit of the invention.

I claim:

1. An o-hydroxybenzimidazole having, in the form of its free base, the following formula:

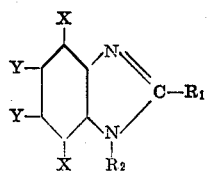

wherein $R_1$ represents a member of the class consisting of H, alkyl and aryl groups, $R_2$ represents a member of the class consisting of H, alkyl and aralkyl groups, one X represents OH and the other H, and one Y represents H and the other Y represents a member of the group consisting of H, alkyl and aryl radicals.

2. A 2-alkyl-substituted o-hydroxybenzimidazole having the following formula:

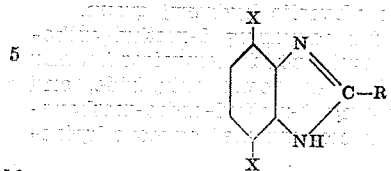

wherein R represents an alkyl group, one X represents OH and the other X represents H.

3. A 2-aryl-substituted o-hydroxybenzimidazole having the following formula:

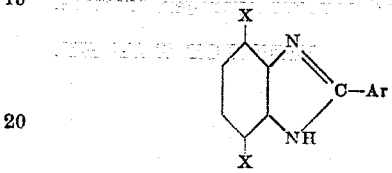

wherein Ar represents an aryl group, one X represents OH and the other X represents H.

4. 2-methyl-o-hydroxybenzimidazole having the following formula:

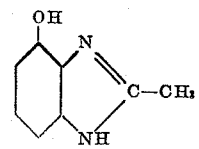

5. 2-phenyl-o-hydroxybenzimidazole having the following formula:

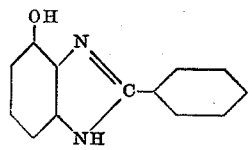

6. A process for preparing an ortho-hydroxybenzimidazole, which comprises heating an anhydride of an organic monocarboxylic acid of the class consisting of fatty acids and carbocyclic monocarboxylic acids with a lower alkyl ether of a 2,3-diaminophenol, in which the 4- position is substituted by hydrogen and the remaining 5- position and 6- positions are occupied, respectively, by hydrogen and a member of the group consisting of hydrogen, alkyl, and aryl groups, and heating the resulting orthoalkoxy benzimidazole in concentrated aqueous hydrogen bromide to effect conversion of the alkoxy group to a phenolic hydroxyl group.

7. A process as defined in claim 6, including the further step of heating the ortho-alkoxy benzimidazole with an alkyl bromide to introduce an alkyl group on a nitrogen atom thereof, prior to heating with concentrated aqueous hydrogen bromide.

8. A process for preparing a 2-aryl-ortho-hydroxy-benzimidazole, which comprises heating 2,3-diaminoanisole with a carbocyclic monocarboxylic acid anhydride, and heating the resulting 2-aryl-ortho-methoxy-benzimidazole with concentrated aqueous hydrozen bromide to effect conversion of the carboxyl group to a phenolic hydroxyl group.

9. A process for preparing 2-alkyl-ortho-hydroxy-benzimidazole, which comprises heating 2,3-diaminoanisole with a fatty acid anhydride, and heating the resulting 2-aryl-ortho-methoxybenzimidazole with concentrated aqueous hydrogen bromide to effect conversion of the carboxyl group to a phenolic hydroxyl group.

10. A process for preparing 2-methyl-ortho-hydroxy-benzimidazole, which comprises heating 2,3-diaminoanisole with acetic anhydride, and heating the resulting 2-methyl-ortho-methoxy-benzimidazole with concentrated aqueous hydrogen bromide.

11. A process for preparing 2-phenyl-ortho-hydroxy-benzimidazole, which comprises heating 2,3-diaminoanisole with the mixed anhydride of benzoic acid and acetic acid and heating the resulting 2-phenyl-ortho-methoxy-benzimidazole with concentrated aqueous hydrogen bromide.

VSEVOLOD TULAGIN.

References Cited in the file of this patent

UNITED STATES PATENTS

| Number | Name | Date |
|---|---|---|
| 2,545,687 | Craig | Mar. 20, 1951 |
| 2,548,845 | Neumann | Apr. 10, 1951 |

FOREIGN PATENTS

| Number | Country | Date |
|---|---|---|
| 359,063 | Great Britain | Oct. 22, 1931 |

OTHER REFERENCES

Beilstein: Organische Chemie, Vierte Auflage, vol. 23, p. 385, citing Cohn, Berichte 32, page 2243.

Weygand: Organic Preparations, 1945, page 194.

Degering: "Outline of Organic Chemistry," 4th ed., p. 196.